Nov. 13, 1923.

A. SEGALL

X-RAY FILM HOLDER

Filed March 29, 1921

Patented Nov. 13, 1923.

1,474,174

UNITED STATES PATENT OFFICE.

AARON SEGALL, OF NEW YORK, N. Y.

X-RAY-FILM HOLDER.

Application filed March 29, 1921. Serial No. 456,744.

*To all whom it may concern:*

Be it known that I, AARON SEGALL, a citizen of the United States, and resident of New York, in the county and State of New York, have invented certain new and useful Improvements in X-Ray-Film Holders, of which the following is a specification.

This invention relates to X-ray film holders of the type which is employed for carrying the film in position for visual inspection as a transparency and for retaining the film for filing and safe storage under conditions of identification.

Holders of the class herein particularly referred to are related to the use and carriage of small X-ray films, such as are generally used in dental or analogous practices as a record of teeth or jaw conditions, and it is the object of my invention to piovide in general an improved X-ray film holder which will possess advantages in point of simplicity, convenience, inexpensiveness, economy in manufacture and use, effectiveness, and general efficiency, and in which the conditions of visibility of the film will be enhanced and the sight will be through only the transparency of the carried film itself.

In the drawings—

Corresponding parts in all the figures are denoted by the same reference characters.

Figure 1:
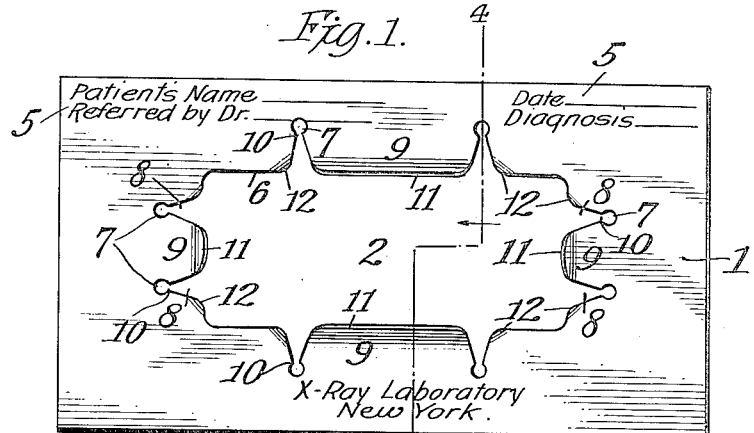
Figure 1 is a face view of the holder constituting my improvements.

Referring to the drawings, 1 designates a card or body sheet, which constitutes the entire body of the holder and is provided in suitable location, centrally or otherwise, with a through opening or cut-away portion, 2, corresponding in area to the size of the X-ray film which is to be carried and viewed. The body sheet and its opening are preferably of rectangular contour, and upon its face is carried the desired designating description or indication, as at 5, to identify the film which is attached to and carried by the holder for visual inspection and for filing or safe storage under desired conditions. Said body sheet may be formed of any suitable material affording the desired thickness or stiffness and the slight flexibility required in the retaining lips hereinafter described, such as thick paper or celluloid, the latter or a material analogous thereto being preferred, and may be of any adapted color, though it is preferably opaque, or provided with an opaque surface surrounding its sight-opening 2, and non-transparent.

Adjacent the edges, 6, of the sight-opening 2 are provided a set of perforations, as at 7, arranged in pairs at diametrically-opposite sides and at right angles with relation to the rectangular contour of the opening 2, which perforations open through slits, as at 8, to the edge of the sight-opening, thus forming a lip, 9, of said edge-portion between the respective pairs of perforations and slits at opposite sides. The perforations 7 are preferably of circular contour, with the edges of the slits 8 intersecting at their outer ends a segment of the perforation in such location as to form a relatively-narrow neck, as at 10, entering the circular perforation, and with the slits expanding outwardly from said neck towards the edge of the sight-opening to form a fan-shaped entrance to the perforation.

Figure 2:
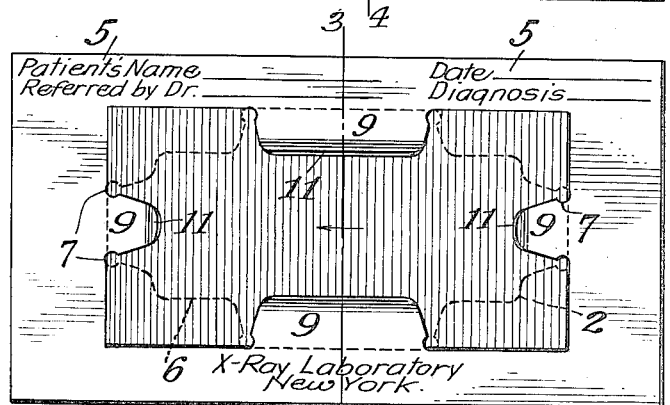
Fig. 2 is a corresponding view with the X-ray film in carried position.
Figure 3:
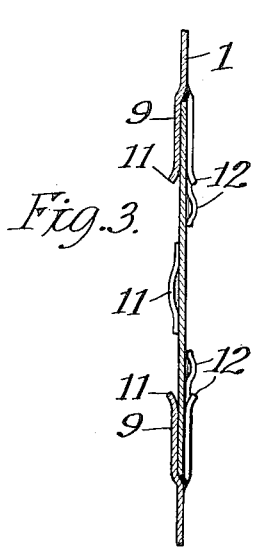
Fig. 3 is a detail cross-section, on an enlarged scale, on the line 3—3, Fig. 2.
Figure 4:
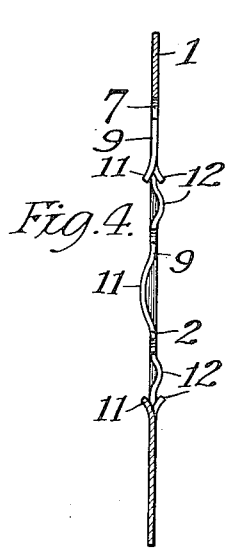
Fig. 4 is a detail cross-section, on an enlarged scale, on the line 4—4, Fig. 1.

It will be noted that the retaining lips are located within the area of the body sheet outside the area of the sight-opening, and that the slits which form said lips extend from the edge of the sight-opening and are located in the portion of the body sheet which surrounds the area of said opening, whereby the film will be sustained upon the base formed by the portion of the body sheet which surrounds the sight-opening and be retained by the lips overlying the sustained edge of the film beyond the edge of the opening, as shown in Fig. 2.

To provide an entrance-guide to the slits and perforations, in the insertion and attachment of the X-ray film, the free edges of the lips 9 are preferably turned or bent up transversely, as at 11, in a slight curvature, and the corners of the slits 8 which intersect the edge 6 of the sight-opening are preferably turned or bent back, as at 12, in a slight curvature, thus providing a double reversed initial guide-entrance in the slidable engagement of the film with the body sheet 1.

The entity body sheet of the device, with its sight-opening and the slits and their terminals forming the retaining lips, is adapted to be formed in a simple operation with a cutting-die in one movement, and the slightly-curved entrance edges 11 and corners 12 can be also formed in the same die movement under suitable conditions when the die cuts down.

Figure 5:
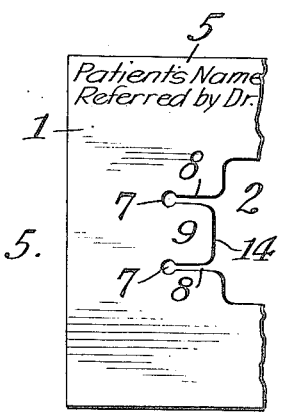
Fig. 5 is a face view illustrating a modified construction of the retaining lips.

In Fig. 5, I have shown one type of modified construction of the retaining lips 9, in which the slits 8 have their opposite edges parallel, thus forming a straight entrance slit of uniform width, and also, in this view, I have illustrated the lips with a straight non-curved free edge, 14, and the slit corners intersecting the edge 6 of the sight-opening also non-curved, though one or both of said curved features may be employed for an entrance guide-construction according to desired conditions of use. If the lips having the non-curved free edge 14 are employed, the lips are preferably shorter and have their free edge terminating beyond and at the outer side of the plane of the edges 6 of the sight-opening 2, as shown.

From the foregoing description, it will be understood that the improved holder constituting my invention provides as an integrality a single body sheet having a through unobstructed sight-opening the edges of which are so formed that they produce retaining lips for engaging and carrying the X-ray film in exposed and unobstructed position at the sight-opening, it being simply necessary to insert the film with its edges in engagement with the edge-lips of the sight-opening, in which position it will be securely carried for visual inspection as a transparency and for filing under identified conditions. Thus, in operative use, the relationship of the entity body sheet of the holder and the attached film is such that when the film is viewed as a transparency by transmitted light no substance or material or celluloid sheet intervenes in the line of vision through the film, and the sight is through only the thickness of the transparent film itself. Aside from the economic advantages and convenience and the enhanced results afforded by the improved holder, the conditions of its operation and use are such that a stronger and thicker sheet body can be employed for the holder, rather than the comparatively thin sheets necessarily used when a celluloid sheet constitutes the film-holder.

In one of the preferred and most convenient customs, in viewing X-ray films by transmitted light, there is employed a table device comprising a transparent glass slab back of which the light is located, the glass slab forming a resting surface upon and against which the film and its holder is placed. My invention is especially adapted to these conditions of use, as it precludes anything in the line of vision through the film other than the film itself and the glass table-slab, whereas with the film holders as usually heretofore employed there will intervene in the line of vision not only the film itself but also the celluloid backing of the holder as well as the glass table-slab, thus impairing the vision by three superposed thicknesses.

Having thus described my invention, I claim and desire to secure by Letters Patent:

1. An X-ray film holder, comprising a body sheet having an unobstructed through sight-opening and provided with lips located within the area of said body sheet outside the area of the sight-opening and at points related to the top and bottom and side edges of said opening, said lips being formed by slits extending from the edge of the sight-opening, and located in the portion of the body sheet which surrounds the area of said opening, whereby the film is sustained upon the base formed by the portion of the body sheet which surrounds the sight-opening and is retained by the lips overlying the sustained edge of the film beyond the edge of the opening.

2. An X-ray film holder, consisting of a body sheet constituting the entire body of the holder and having an unobstructed through sight-opening and provided adjacent the edge of said opening with circular perforations and approximately fan-shaped slits extending therefrom to said edge and producing intervening lips which are located entirely within the edge portion of the sheet at the opening, whereby the lips will engage above and upon the edges of the film with the latter supported upon the surrounding edge portion of the opening and thus retain the same in inserted position for visual and unobstructed inspection as a transparency through the sight-opening.

In testimony whereof I have signed the foregoing specifications.

AARON SEGALL.